US009634545B2

(12) United States Patent
Neet et al.

(10) Patent No.: US 9,634,545 B2
(45) Date of Patent: Apr. 25, 2017

(54) COMPONENT FOR AN ELECTRIC MACHINE

(71) Applicant: REMY TECHNOLOGIES, L.L.C., Pendleton, IN (US)

(72) Inventors: Kirk Neet, Pendleton, IN (US); Christopher Bledsoe, Anderson, IN (US)

(73) Assignee: REMY TECHNOLOGIES, L.L.C., Pendleton, IN (US)

(*) Notice: Subject to any disclaimer, the term of this patent is extended or adjusted under 35 U.S.C. 154(b) by 0 days.

(21) Appl. No.: 14/197,947

(22) Filed: Mar. 5, 2014

(65) Prior Publication Data

US 2015/0069884 A1   Mar. 12, 2015

Related U.S. Application Data

(63) Continuation-in-part of application No. 14/021,797, filed on Sep. 9, 2013.

(51) Int. Cl.
*H02K 9/00* (2006.01)
*H02K 21/12* (2006.01)
*H02K 1/22* (2006.01)
*H02K 9/06* (2006.01)

(52) U.S. Cl.
CPC ..................... *H02K 9/06* (2013.01)

(58) Field of Classification Search
CPC ............. H02K 5/04; H02K 5/22; F04D 29/32
USPC .............................. 310/60 R, 62, 156.66, 263
See application file for complete search history.

(56) References Cited

U.S. PATENT DOCUMENTS

| | | | |
|---|---|---|---|
| 2,581,872 A * | 1/1952 | Morrison | F04D 29/34 416/212 R |
| 2,588,175 A | 3/1952 | Stewart et al. | |
| 2,654,529 A | 10/1953 | Smith | |
| 4,686,399 A | 8/1987 | Imori et al. | |
| 4,826,405 A | 5/1989 | Robb | |
| 4,961,016 A | 10/1990 | Peng et al. | |
| 5,693,992 A | 12/1997 | Kurusu et al. | |
| 5,944,497 A | 8/1999 | Kershaw et al. | |
| 6,462,440 B1 | 10/2002 | Asao et al. | |
| 6,707,181 B1 | 3/2004 | Militello et al. | |
| 7,358,630 B2 | 4/2008 | Vasilescu et al. | |
| 7,365,471 B2 | 4/2008 | Creviston et al. | |
| 7,385,322 B2 | 6/2008 | Park | |
| 8,684,676 B1 | 4/2014 | Kirkpatrick | |
| 8,847,446 B2 * | 9/2014 | Maley | H02K 7/003 29/598 |
| 2002/0076341 A1 | 6/2002 | Morelli | |
| 2003/0042806 A1 | 3/2003 | Inaba et al. | |

(Continued)

OTHER PUBLICATIONS

International Search Report and Written Opinion for PCT Application No. PCT/US2014/038045, dated Sep. 12, 2014, pp. 1-11.

(Continued)

*Primary Examiner* — Jose Gonzalez Quinones
(74) *Attorney, Agent, or Firm* — Cantor Colburn LLP

(57) ABSTRACT

An electric machine component includes a rotor assembly having at least one claw pole member having a number of pole members, an outer fan member support surface, and a central hub projecting from the outer fan member support surface. The central hub includes an anti-rotation member and a substantially planar bearing surface.

17 Claims, 5 Drawing Sheets

(56) References Cited

U.S. PATENT DOCUMENTS

| | | |
|---|---|---|
| 2005/0285459 A1 | 12/2005 | Ishida et al. |
| 2006/0250033 A1 | 11/2006 | Vasilescu et al. |
| 2007/0024131 A1 | 2/2007 | Rouleau et al. |
| 2009/0039719 A1* | 2/2009 | Nakamura ............... H02K 9/06 310/62 |
| 2011/0229358 A1 | 9/2011 | Streng et al. |
| 2011/0316369 A1 | 12/2011 | Neet et al. |
| 2013/0113312 A1 | 5/2013 | Maley |
| 2013/0280086 A1 | 10/2013 | Chou |
| 2014/0339964 A1 | 11/2014 | Bledsoe et al. |
| 2015/0069883 A1 | 3/2015 | Neet et al. |

OTHER PUBLICATIONS

Office Action issued on Apr. 28, 2016 in related Korean Patent Application No. 10-2015-0030753, 9 pages.

* cited by examiner

COMPONENT FOR AN ELECTRIC MACHINE

CROSS-REFERENCE TO RELATED APPLICATION

This application is a Continuation-In-Part of U.S. application Ser. No. 14/021,797 filed Sep. 9, 2013, the disclosure of which is incorporated by reference herein in its entirety.

BACKGROUND OF THE INVENTION

Exemplary embodiments pertain to the art of electric machines and, more particularly, to a component for an electric machine.

Many electric machines include a stator and a rotor that are shifted relative to one another to create an electromotive force. In many cases, a fan is mounted relative to the rotor. In operation, the rotor spins the fan which, in turn, provides a cooling airflow to the electric machine. At present, the particular mounting of the fan to the rotor creates limitations on electric machine size. More specifically, mounting the fan to the rotor requires certain mounting structures on both components. As electric machines become smaller, pulleys and other components are mounted closer to the rotor. The particular structure required for mounting the fan limits the distance that the pulley, or other such components, can be mounted relative to the rotor.

BRIEF DESCRIPTION OF THE INVENTION

Disclosed is an electric machine component including a rotor assembly having at least one claw pole member including a number of pole members, an outer fan member support surface, and a central hub projecting from the outer fan member support surface. The central hub includes at least one anti-rotation member and a substantially planar bearing surface.

Also disclosed is an electric machine including a housing, a stator fixedly mounted relative to the housing, and a rotor assembly rotatably mounted relative to the stator. The rotor assembly includes at least one claw pole member having a number of pole members, an outer fan member support surface, and a central hub projecting from the outer fan member support surface. The central hub includes at least one anti-rotation member and a substantially planar bearing surface. A fan member is mounted to the rotor assembly. The fan member includes a hub portion and a number of fan blades that project radially outwardly from the hub portion. The fan member is configured and disposed to be staked to the at least one claw pole member through the central hub.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
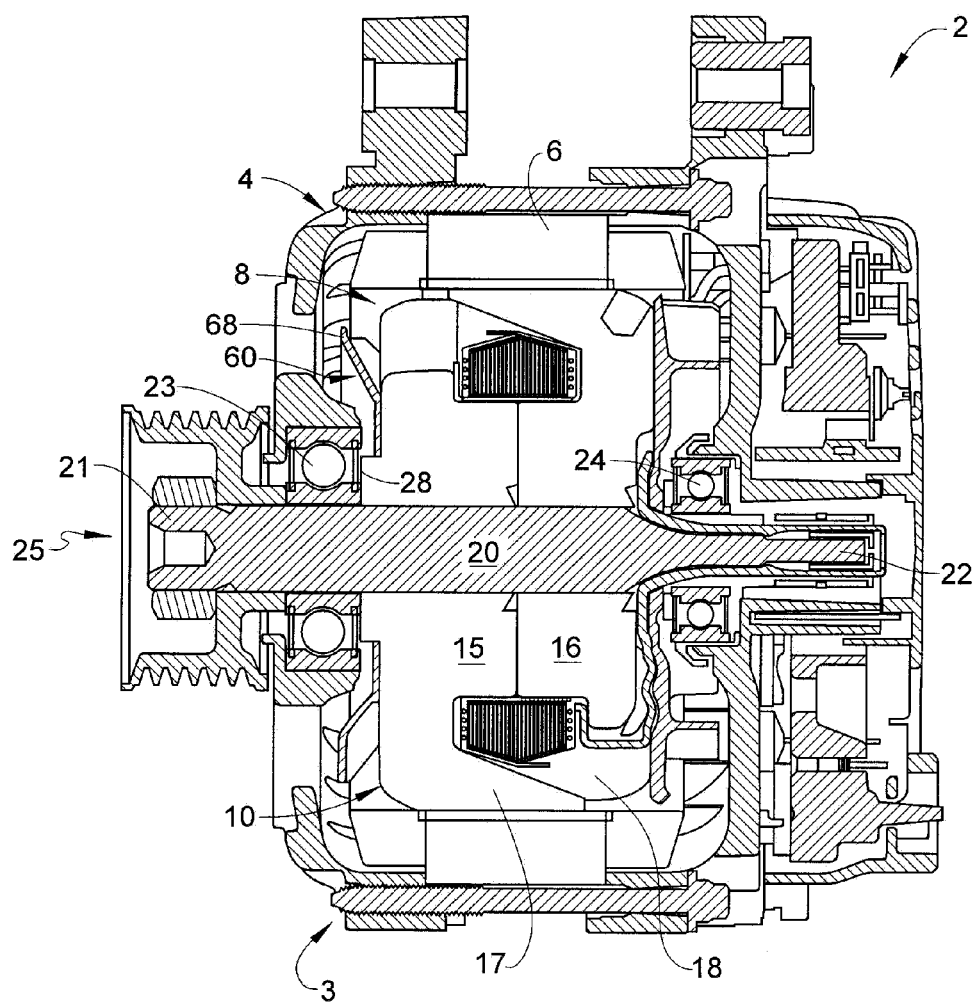
FIG. 1 depicts a cross-sectional view of an electric machine including a rotor assembly and a fan member, in accordance with an exemplary embodiment.
Figure 2:
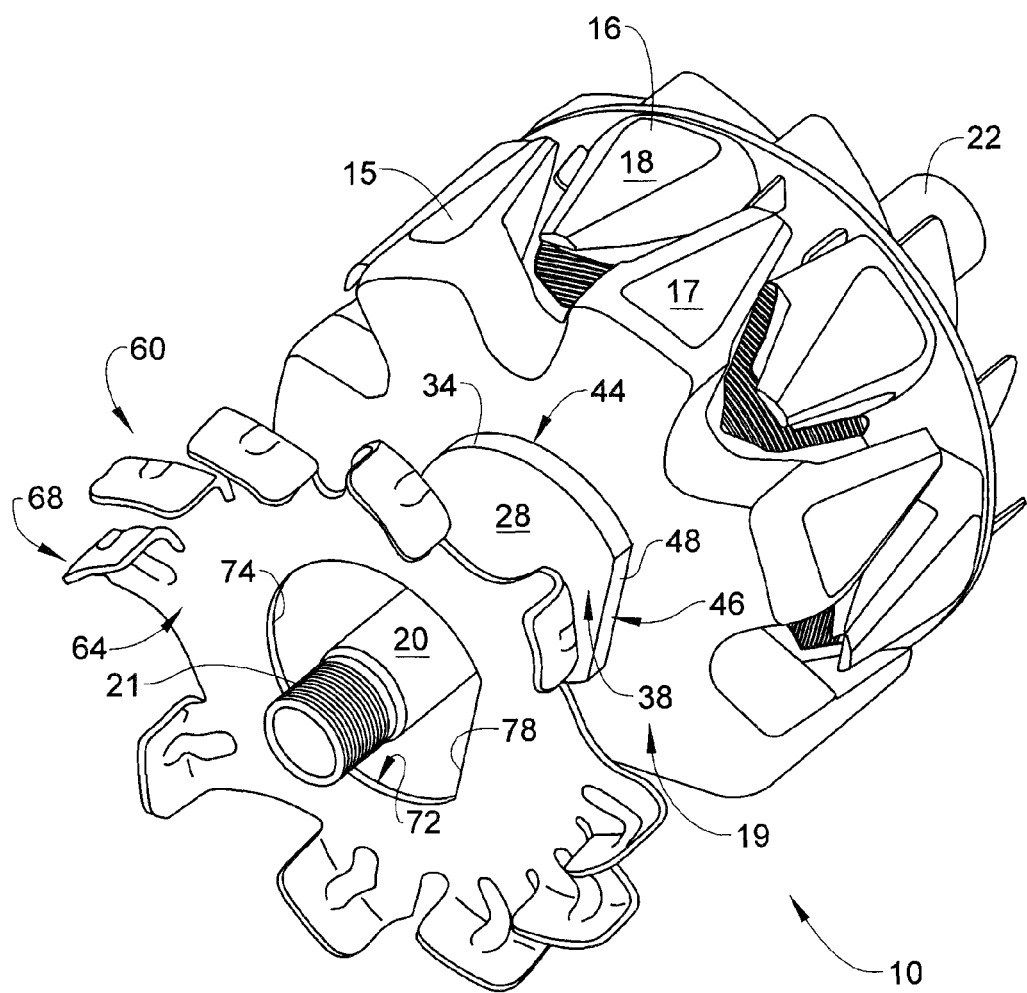
FIG. 2 depicts a partially disassembled perspective view of the rotor assembly and fan member of FIG. 1, in accordance with an aspect of the exemplary embodiment.
Figure 3:
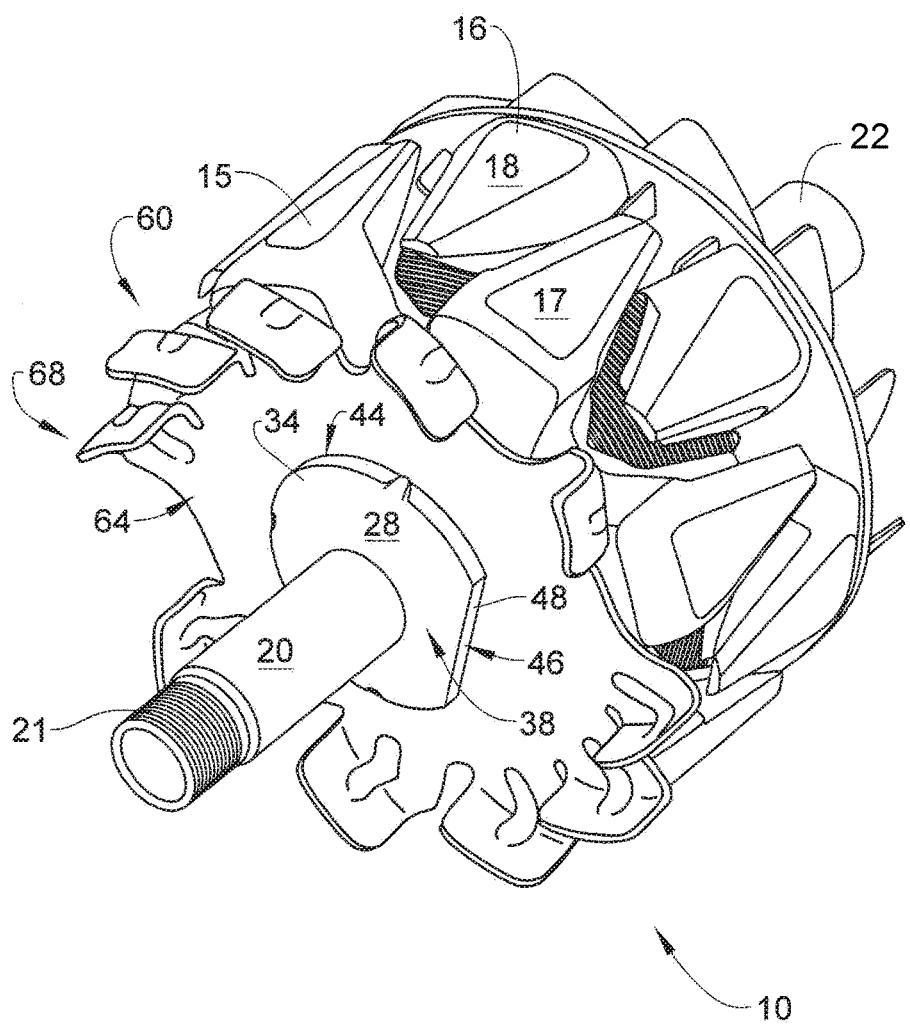
FIG. 3 depicts an assembled perspective view of the rotor assembly and fan member of FIG. 2.

With reference to FIGS. 1-3, an electric machine, constructed in accordance with an exemplary embodiment, is indicated generally at 2. Electric machine 2 is shown in the form of an alternator 3 and includes a housing 4 within which is arranged a stator 6 and a rotor assembly 8. Rotor assembly 8 rotates relative to stator 6 and includes a rotor 10 having a first half or claw pole member 15 and a second half or claw pole member 16. Each claw pole member 15 and 16 includes a corresponding plurality of pole members, one of which is indicated at 17, on first claw pole member 15, and at 18 on second claw pole member 16. In the exemplary embodiment shown, the plurality of pole members 17 on first claw pole member 15 represents half of a total number of pole members for rotor 10 and the plurality of pole members 18 on second claw pole member 16 represents another half of the total number of pole members of rotor 10. First claw pole member 15 also includes an outer fan member support surface 19. Further shown in FIG. 1, rotor 10 includes a shaft 20 that extends from a first end 21 to a second end 22. First end 21 is supported by a first bearing 23 and second end 22 is supported by a second bearing 24. First end 20 also supports a pulley 25.

In accordance with an exemplary embodiment, rotor 10 includes a central hub 28 having a substantially planar bearing surface 38 that may abut first bearing 23. Central hub 28 includes a curvilinear portion 44 and a substantially linear portion 46 that forms a locating and anti-rotation member 48. Anti-rotation member 48 is shown as being substantially linear, however it should be understood that other geometries including protrusions, divots and the like may also be employed. A fan member 60 is mounted to claw pole member 15 at outer fan member support surface 19, as will be discussed more fully below. Fan member 60 includes a hub portion 64 and a plurality of fan blades 68. Fan blades 68 project radially outwardly from hub portion 64. Hub portion 64 includes an opening 72 having a curvilinear section 74 and a substantially linear section 78 that defines an anti-rotation element 79. While shown and described as being substantially linear, anti-rotation element 79 may take on any one of a number of geometries that cooperate with anti-rotation member 48. Opening 72 is configured to receive central hub 28 of claw pole member 15.

In further accordance with the exemplary embodiment, fan member 60 is positioned at outer fan member support surface 19 with central hub 28 projecting through opening 72 beyond, hub portion 64. At this point it should be understood that fan member 60 may directly abut outer fan member support surface 19 or a gap may exist between hub portion 64 and outer fan member support surface 19. Substantially linear portion 46 and substantially linear section 78 cooperate to establish a desired alignment of fan member 60 and claw pole member 15. Substantially linear portion 46 and substantially linear section 78 also cooperate to constrain rotation of fan member 60 relative to first claw pole member 15. Once in position, the central hub 28 is staked or deformed to create a mechanical bond between central hub 28 and hub portion 64. Bearing surface 38 may be exposed to a deformation force that extends continuously along curvilinear portion 44 or, alternatively, to a number of discrete deformation forces about curvilinear portion 44. The number of discrete deformation forces may be applied in unison or in a predetermined sequence.

Figure 4:
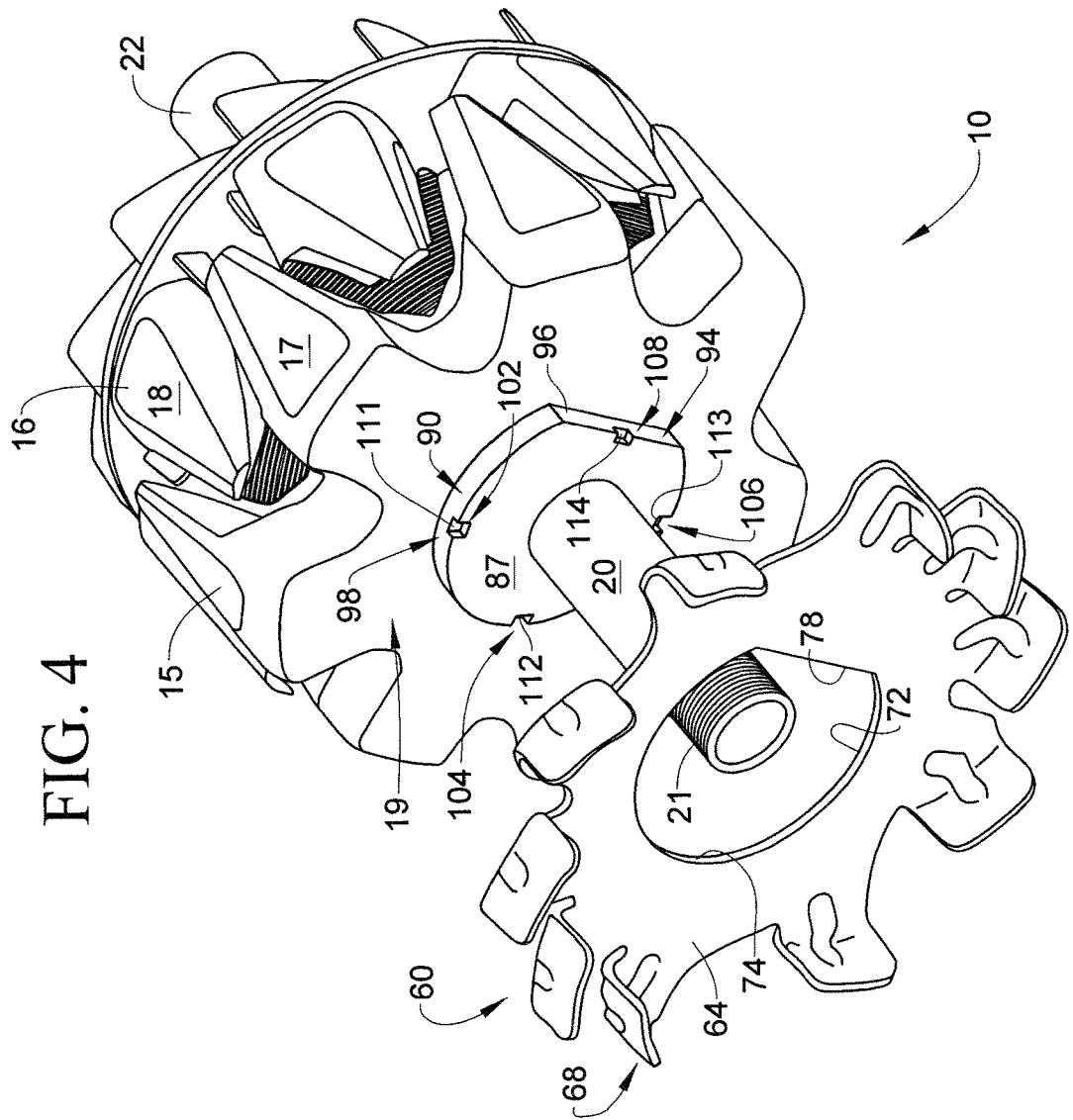
FIG. 4 depicts a partially disassembled view of a rotor assembly and fan member, in accordance with another aspect of the exemplary embodiment.
Figure 5:
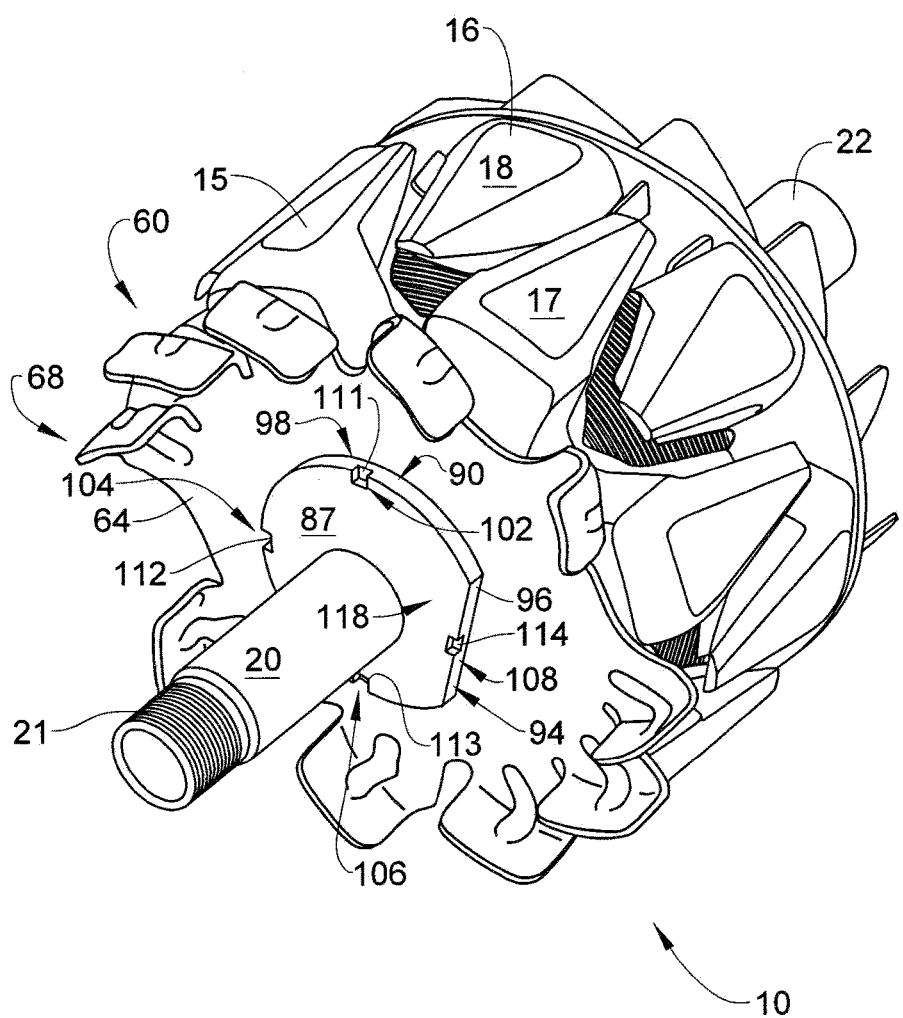
FIG. 5 depicts an assembled view of the rotor assembly and fan member of FIG. 4.

Reference will now follow to FIGS. 4 and 5, wherein like reference numbers represent corresponding parts in the respective views, in describing a central hub 87, in accordance with another aspect of the exemplary embodiment. Central hub 87 includes a curvilinear portion 90 and a substantially linear portion 94 that operates as a locating member 96 in a manner similar to that discussed above. In accordance with the exemplary embodiment shown, central hub 87 includes a plurality of discrete step members indicated generally at 98.

In further accordance with the exemplary embodiment shown, discrete step members 98 include a first step member 102, a second step member 104, a third step member 106 and a fourth step member 108. First, second, and third step members 102, 104, and 106 are arrayed about curvilinear portion 90 and fourth step member 108 is arranged on substantially linear portion 94. First step member 102 defines a first fan member mounting surface 111, second step member 104 defines a second fan member mounting surface 112, third step member 106 defines a third fan member mounting surface 113, and fourth step member 108 defines a fourth fan member mounting surface 114. In addition, first, second, third, and fourth step members 102, 104, 106, and 108 define a substantially planar bearing surface 118 that may abut first bearing 23.

In a manner similar to that discussed above, fan member 60 is positioned at outer fan member support surface 19 with central hub 87 projecting through opening 72 and each step member 102, 104, 106 and 108 terminating at, or projecting beyond, hub portion 64. At this point it should be understood that fan member 60 may directly abut outer fan member support surface 19 or a gap may exist between hub portion 64 and outer fan member support surface 19. Substantially linear portion 94 and substantially linear section 78 cooperate to establish a desired alignment of fan member 60 and first claw pole member 15. Substantially linear portion 94 and substantially linear section 78 also cooperate to constrain rotation of fan member 60 relative to first claw pole member 15. Once in position, each fan member mounting surface 111-114 is, staked or deformed, to create a mechanical bond between central hub 87 and hub portion 64.

At this point it should be apparent that by forming the fan member mounting surface(s) into the central hub, tooling and manufacturing steps may be simplified and production and component costs can be reduced. Reducing component costs by as little as a few cents per unit can result in a significant cost savings over time. Further, by forming the fan member mounting surface(s) at the central hub, the number and size of connection points can be reduced. Reducing the number and size of connection points enables the rotor assembly to be formed having a shorter axial dimension. The shorter axial dimension enables electric machine to be formed having a more compact form factor.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine component comprising:
a rotor assembly including at least one claw pole member having a number of pole members, an outer fan member support surface, and a central hub projecting from the outer fan member support surface, the central hub including an anti-rotation member and a substantially planar bearing surface; and
a fan member mounted to the rotor assembly through the central hub, the fan member having a hub portion and a number of fan blades that project radially outwardly from the hub portion, wherein the central hub includes a plurality of discreet deformations spaced about the central hub that mechanically joins the fan member to the at least one claw pole member.

2. The electric machine component according to claim 1, wherein the hub portion includes a curvilinear section and an anti-rotation element that cooperates with the anti-rotation member to align the fan member with the at least one claw pole member.

3. The electric machine component according to claim 2, wherein the anti-rotation member is substantially linear.

4. The electric machine component according to claim 1, wherein the plurality of deformation zones comprises a plurality of discrete step members arrayed about at least a portion of the central hub.

5. The electric machine component according to claim 4, wherein the central hub includes a curvilinear portion and a portion of the plurality of discrete step members are formed in the curvilinear portion.

6. The electric machine component according to claim 4, wherein the central hub includes a substantially linear portion and at least one of the plurality of discrete step members is formed in the substantially linear portion.

7. The electric machine component according to claim 1, wherein the fan member is staked to the central hub through the plurality of discrete step members.

8. The electric machine component according to claim 1, wherein the fan member directly abuts the outer fan member support surface.

9. An electric machine comprising:
a housing;
a stator fixedly mounted relative to the housing;
a rotor assembly rotatably mounted relative to the stator, the rotor assembly including at least one claw pole member having a number of pole members, an outer fan member support surface, and a central hub projecting from the outer fan member support surface, the central hub including an anti-rotation member; and
a fan member mounted to the rotor assembly through the central hub, the fan member including a hub portion and a number of fan blades that project radially outwardly from the hub portion, wherein the central hub includes a plurality of discreet deformations spaced about the central hub that mechanically joins the fan member to the at least one claw pole member.

10. The electric machine according to claim 9, wherein the fan member directly abuts the outer fan member support surface.

11. The electric machine according to claim 9, wherein the hub portion includes an anti-rotation element configured to engage with the anti-rotation member to align the fan member and the at least one claw pole member.

12. The electric machine according to claim 11, wherein the anti-rotation element is substantially linear.

13. The electric machine according to claim 12, wherein the anti-rotation member is substantially linear.

14. The electric machine according to claim 13, wherein the central hub includes a substantially linear portion and at least one of the plurality of discrete step members is formed in the substantially linear portion.

15. The electric machine according to claim 9, wherein the plurality of deformation zones comprises a plurality of discrete step members arrayed about at least a portion of the central hub.

16. The electric machine according to claim 15, wherein the fan member is staked to the claw pole member through the plurality of discrete step members.

17. The electric machine according to claim 9, wherein the central hub includes a curvilinear portion and a portion of the plurality of discrete deformations members are formed in the curvilinear portion.

\* \* \* \* \*